United States Patent
Dumba et al.

(10) Patent No.: US 12,328,221 B2
(45) Date of Patent: Jun. 10, 2025

(54) SCALABLE MECHANISMS FOR WORKLOAD MANAGEMENT IN EDGE COMPUTING

(71) Applicant: INTERNATIONAL BUSINESS MACHINES CORPORATION, Armonk, NY (US)

(72) Inventors: Braulio Gabriel Dumba, White Plains, NY (US); Gloire Rubambiza, Mountain View, CA (US); Andrew John Anderson, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/335,749

(22) Filed: Jun. 15, 2023

(65) Prior Publication Data

US 2024/0422052 A1 Dec. 19, 2024

(51) Int. Cl.
- H04L 41/0668 (2022.01)
- G16Y 10/75 (2020.01)
- G16Y 30/00 (2020.01)
- H04L 67/568 (2022.01)

(52) U.S. Cl.
CPC .......... H04L 41/0668 (2013.01); G16Y 10/75 (2020.01); G16Y 30/00 (2020.01); H04L 67/568 (2022.05)

(58) Field of Classification Search
CPC ... H04L 41/0668; H04L 67/568; G16Y 10/75; G16Y 30/00
See application file for complete search history.

(56) References Cited

U.S. PATENT DOCUMENTS

| | | | |
|---|---|---|---|
| 10,812,615 B2 | 10/2020 | Shen et al. | |
| 2005/0083858 A1* | 4/2005 | Loa | H04L 45/08 706/14 |
| 2005/0273668 A1 | 12/2005 | Manning | |
| 2022/0224776 A1* | 7/2022 | Doshi | G06F 12/0897 |
| 2022/0272578 A1 | 8/2022 | Luo | |
| 2023/0229778 A1* | 7/2023 | Terpstra | G06F 21/57 713/2 |

OTHER PUBLICATIONS

Juang, P. et al. Energy-efficient computing for wildlife tracking. Architectural Support for Programming Languages and Operating Systems. Proc. 10th Int. Conf. on Architectural Support for Programming Languages and Operating Systems (ASPLOS X), ACM. published Dec. 2002 https://doi.org/10.1145/605397.605408 <retrieved from the Internet on Tuesday, Mar. 21, 2023 at 12:33 PM>.

(Continued)

*Primary Examiner* — David R Lazaro
*Assistant Examiner* — Zia Khurshid
(74) *Attorney, Agent, or Firm* — KONRAD, RAYNES, DAVDA & VICTOR LLP; Rabindranath Dutta

(57) ABSTRACT

An edge site maintains a plurality of rendezvous nodes to which a plurality of Internet of Things (IoT) devices are communicatively coupled, where the plurality of rendezvous nodes are also communicatively coupled to an edge hub in the edge site. A cached model is maintained at the edge hub, where the cached model enables the edge site to stay operational in an event of a failure of a cloud hub to which the edge hub is communicatively coupled.

18 Claims, 10 Drawing Sheets

(56) References Cited

OTHER PUBLICATIONS

Dumba, Braulio et al., "Experience in Implementing & Deploying a Non-IP Routing Protocol VIRO in GENI", pp. 533-539, DOI: 10.1109/ICNP.2014.85, published Dec. 2014 <retrieved from the Internet on Tuesday, Mar. 21, 2023 at 12:22 PM>.
Dilley, John et al., "Globally Distributed Content Delivery", IEEE Internet Computing, vol. 6, Issue 5, pp. 50-58, ACM, published Sep. 1, 2002 <retrieved from the Internet on Tuesday, Mar. 21, 2023 at 12:21st PM>.
Hassan, Shaddi et al., "Scaling Community Cellular Networks with CommunityCellularManager", 16th USENIX Symposium on Networked Systems Design and Implementation (NSDI 19), USENIX Association, pp. 735-750, published Feb. 2019 <retrieved from the Internet on Tuesday, Mar. 21, 2023 at 12:22 PM>.
Nygren, Erik et al., "The Akamai Network: A Platform for High-Performance Internet Applications", ACM SIGOPS Operating Systems Review, vol. 44, Issue 3, Jul. 2010, pp. 2-19, https://doi.org/10.1145/1842733.1842736, published Aug. 17, 2010 <retrieved from the Internet on Tuesday, Mar. 21, 2023 at 11:35 AM>.
Jha, Sagar et al., "Visage: Enabling Timely Analytics for Drone Imagery", MobiCom '21: Proceedings of the 27th Annual International Conference on Mobile Computing and Networking, pp. 789-803, https://doi.org/10.1145/3447993.3483273, published Oct. 25, 2021 <retrieved from the Internet on Tuesday, Mar. 21, 2023 at 12:20 PM>.
"IoT Core: Solutions to easily and securely connect, manage, and ingest data from globally dispersed devices", google.com, published Feb. 21, 2018 <retrieved from the Internet on Mar. 21, 2023 at 9:21 AM>.
"Overview of Amazon Web Services", AWS Whitepaper, published Aug. 5, 2021(describes aspects of previously released AWS IoT Core, originally released to the public on Dec. 18, 2015) Tuesday, Mar. 21, 2023 at 12:21 PM.
"What is Azure IoT Edge", Microsoft.com, this article was published Feb. 1, 2023, this article was published on Feb. 1, 2023, (describes aspects of previously released Microsoft Azure IoT Edge, originally released to the public on Jun. 27, 2018) <retrieved from the Internet on Mar. 21, 2023 at 9:31 AM>.
"What is enterprise asset management?", © 2023, IBM EAM released before Jul. 28, 2017 <retrieved from the Internet on Tuesday, Mar. 21, 2023 at 9:26 AM>.
Fang, Chao et al., "Energy-Efficient Hierarchical Collaborative Scheme for Content Delivery in Mobile Edge Computing", Wireless Communications and Mobile Computing, vol. 2022, Article ID 8392511, 10 pages, 2022. https://doi.org/10.1155/2022/8392511, published Apr. 1, 2022 <retrieved from the Internet on Thursday, Mar. 30, 2023 at 9:12 PM>.
Huang, Yaodong et al., "Peer Data Caching Algorithms in Large-Scale High-Mobility Pervasive Edge Computing Environments," 2018 IEEE 37th International Performance Computing and Communications Conference (IPCCC), Orlando, FL, USA, 2018, pp. 1-8, doi: 10.1109/PCCC.2018.8711041, published Nov. 11, 2018 <retrieved from the Internet on Thursday, Mar. 30, 2023 at 8:23 PM>.
Kim, S., "Collaborative Resource Sharing Game Based Cloud-Edge Offload Computing Orchestration Scheme," in IEEE Access, vol. 10, pp. 74523-74532, 2022, doi: 10.1109/ACCESS.2022.3190857, published Jul. 14, 2022 <retrieved from the Internet on Thursday, Mar. 30, 2023 at 9:52 PM>.
Sang, Zihao et al. "Collaborative Video Cache Management Strategy in Mobile Edge Computing" in 2021 IEEE Wireless Communications and Networking Conference (WCNC). IEEE Press, 1-6. DOI: 10.1109/WCNC49053.2021.9417255, published Mar. 29, 2021 <retrieved from the Internet on Friday, Mar. 31, 2023 at 11:23 AM>.
Zeng, F. et al., "Efficient Caching in Vehicular Edge Computing Based on Edge-Cloud Collaboration," in IEEE Transactions on Vehicular Technology, vol. 72, No. 2, pp. 2468-2481, Feb. 2023, DOI: 10.1109/TVT.2022.3213130, electronically (first) published Oct. 10, 2022, physically republished Feb. 2, 2023 <retrieved from the Internet on Friday, Mar. 31, 2023 at 11:24 AM>.
B. Dumba, et al., "How to Experiment with 1 Million+Edge Devices", 15 pp., [online][retrieved Jun. 15, 2023] https://medium.com/@brauliodumba/how-to-experiment-with-1-million-edge-devices-fa2ad491527d.

* cited by examiner

┌─ 600
| Recommendation algorithm pseudo-code for generating the balanced binary tree
|
| 602 — Algorithm 1 RDV Recommendation Algorithm
|
|     def estimate_rdv(total_endpts, desired_covg_pct):
|       subtree_endpts = total_endpts / 2    ~604   ~606
|       max_depth = get_tree_depth(total_endpts)
|       starting_depth = 1
|       rec_node_lvl = rec_estimate_rdv(subtree_endpts, total_endpts, starting_depth, max_depth, desired_covg_pct)
|       return max_depth, pow(2, rec_node_lvl), rec_node_lvl
|
|     def rec_estimate_rdv(subtree_endpts, total_endpts, depth, max_depth, desired_covg_pct):
|
|       if depth == max_depth then
|         return depth - 1
|       end if
|
|       coverage_percent = (subtree_endpts/total_endpts) * 100
|       if coverage_percent < desired_covg_pct then
|         return depth
|       end if
|
|       subtree_endpts = subtree_endpts / 2
|       depth += 1
|       return rec_estimate_rdv(subtree_endpts, total_endpts, depth, max_depth, desired_covg_pct)
|
| 608 — Algorithm 2 Binary Tree Depth Recommendation Algorithm
|
|     def get_tree_depth(total_endpts):
|       tree_depth = 1
|       current_depth_endpts = pow(2, tree_depth)
|       while current_depth_endpts <= total_endpts do
|         if current_depth_endpts == total_endpts then
|           break
|         end if
|
|         tree_depth += 1
|         current_depth_endpts = pow(2, tree_depth)
|       end while
|       return tree_depth

FIG. 6

SCALABLE MECHANISMS FOR WORKLOAD MANAGEMENT IN EDGE COMPUTING

BACKGROUND

Embodiments relate to a method, system, and computer program product that provide scalable mechanisms for workload management in edge computing.

Edge Computing is used as an application service provisioning paradigm for low-latency access to services in a cellular telephony network. It should be noted that Edge computing is not just focused on services for cellular telephony network but is a more general concept and may be used in other domains. In certain edge computing paradigms, service providers deploy their application services on edge servers adjacent to mobile base stations. Computationally intensive operations from Internet-of-Things (IoT) devices may be directed to nearby edge servers as the IoT devices move around, in order to reduce latency in comparison to accessing services located at traditional cloud data centers.

Many entities are evolving from a centralized cloud approach to one that includes edge computing. Edge computing brings cloud computing resources to the edge of the network and pushes applications, data, and services geographically closer to where such services are requested. The need to process and analyze instant data generated at the edge has encouraged entities to move towards deploying workloads into micro data centers at the edge. These workloads are deployed across multiple sites from manufacturing flooring in industry to space exploration. Such approaches that bring cloud computing resources to the edge of the network may be referred to as a distributed cloud paradigm.

SUMMARY

Provided are a method, system, and computer program product in which an edge site maintains a plurality of rendezvous nodes to which a plurality of Internet of Things (IoT) devices are communicatively coupled, where the plurality of rendezvous nodes are also communicatively coupled to an edge hub in the edge site. A cached model is maintained at the edge hub, where the cached model enables the edge site to stay operational in an event of a failure of a cloud hub to which the edge hub is communicatively coupled.

In additional embodiments, operations are performed to generate a balanced binary tree data structure to distribute the plurality of IoT devices among the plurality of rendezvous nodes. In response to a failure of a selected rendezvous node, selected IoT devices that were communicatively coupled to the selected rendezvous node are switched to an operational rendezvous node.

In further embodiments, in response to a failure of the edge hub, the plurality of rendezvous nodes continue to provide services to the plurality of IoT devices.

In certain embodiments, operations are performed to communicatively couple a plurality of edge hubs of a plurality of edge sites to a cloud hub. Operations are performed for deploying edge applications and collecting status for workloads at the edge site that provides additional capabilities beyond those provided by a hub and spoke model. Operations are performed to deploy a framework that removes barriers to scale workload lifecycle operations at the edge site and provides multi-layer resilience against failures.

In further embodiments, horizontal scaling is performed across a plurality of edge computing sites, and cached models ensure disconnected operation.

In certain embodiments, operations are performed to deploy a rendezvous node selection algorithm that takes into consideration cost and resilience trade-offs, where the rendezvous node selection algorithm minimizes a number of intermediate nodes, and where the rendezvous node selection algorithm is scalable in time and space complexity and number of edge endpoints.

In further embodiments, cost and resilience trade-offs are considered at the edge site.

BRIEF DESCRIPTION OF THE DRAWINGS

Referring now to the drawings in which like reference numbers represent corresponding parts throughout:

FIG. 6 illustrates a block diagram that shows pseudo-code for exemplary recommendation algorithms, in accordance with certain embodiments.

DETAILED DESCRIPTION

Figure 1:
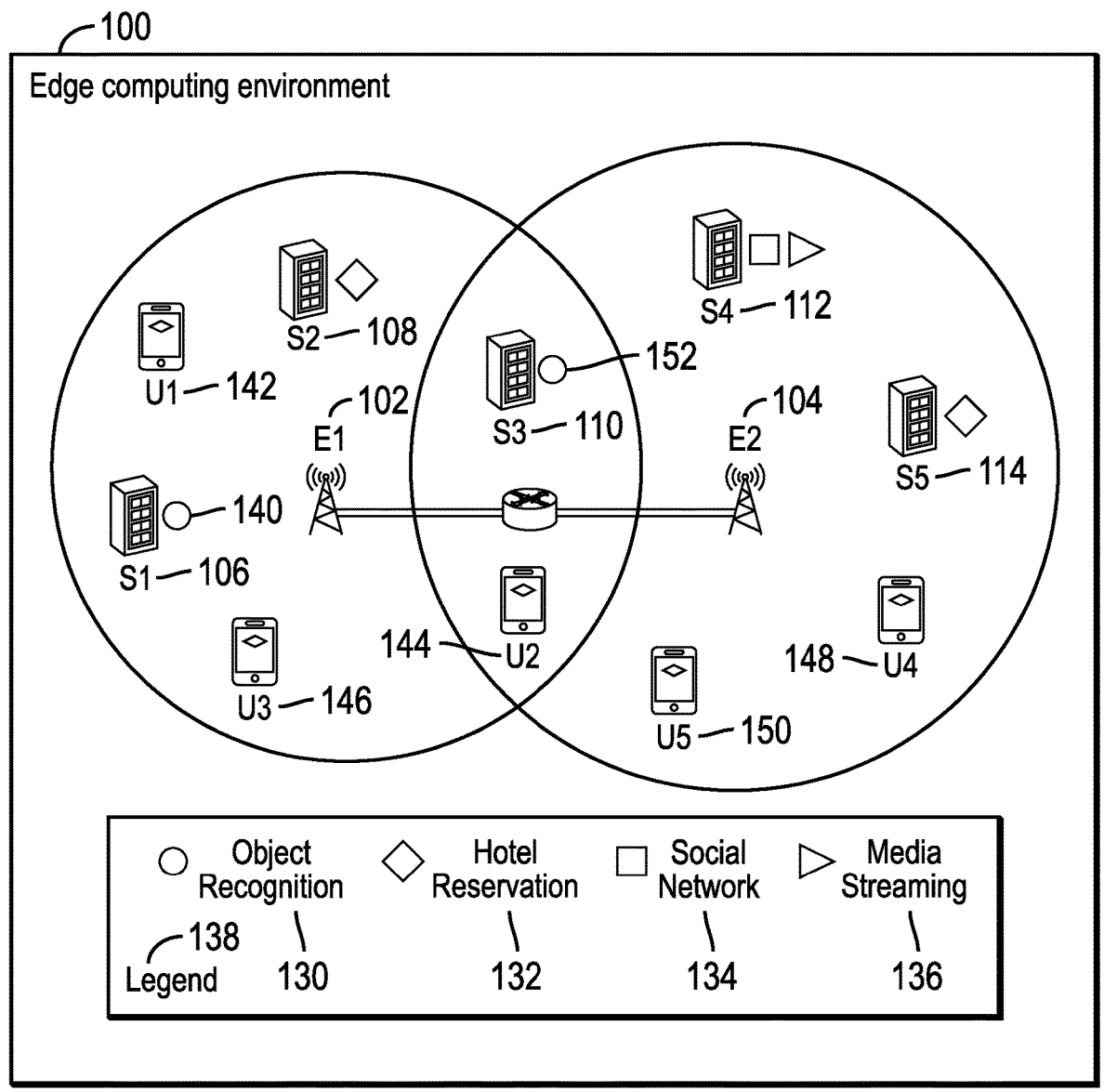
FIG. 1 illustrates a block diagram of an edge computing environment, in accordance with certain embodiments.

In the following description, reference is made to the accompanying drawings which form a part hereof and which illustrate several embodiments. It is understood that other embodiments may be utilized and structural and operational changes may be made. Several examples will now be provided to further clarify various embodiments of the present disclosure:

Example 1: A method in which an edge site maintains a plurality of rendezvous nodes to which a plurality of Internet of Things (IoT) devices are communicatively coupled, where the plurality of rendezvous nodes are also communicatively coupled to an edge hub in the edge site. A cached model is maintained at the edge hub, where the cached model enables the edge site to stay operational in an event of a failure of a cloud hub to which the edge hub is communicatively coupled. As a result, scalable mechanisms are provided for workload management in edge computing and performance improvements are made in the operations of computing systems.

Example 2: The limitations of any of Examples 1 and 3-7, where operations are performed to generate a balanced binary tree data structure to distribute the plurality of IoT devices among the plurality of rendezvous nodes. In response to a failure of a selected rendezvous node, selected IoT devices that were communicatively coupled to the selected rendezvous node are switched to an operational rendezvous node. As a result, scalability and redundancy improvements are provided for workload management in edge computing.

Example 3: The limitations of any of Examples 1-2 and 4-7, where in response to a failure of the edge hub, the plurality of rendezvous nodes continue to provide services to the plurality of IoT devices. As a result, fault tolerance mechanisms are provided for workload management in edge computing.

Example 4 The limitations of any of Examples 1-3 and 5-7, where operations are performed to communicatively couple a plurality of edge hubs of a plurality of edge sites to a cloud hub. Operations are performed for deploying edge applications and collecting status for workloads at the edge site that provides additional capabilities beyond those provided by a hub and spoke model. Operations are performed to deploy a framework that removes barriers to scale workload lifecycle operations at the edge site and provides multi-layer resilience against failures. As a result, multi-layer resilience against failures is provided for workload management in edge computing.

Example 5: The limitations of any of Examples 1-4 and 6-7, where horizontal scaling is performed across a plurality of edge computing sites, and cached models ensure disconnected operation. As a result, mechanisms for disconnected operations are provided for workload management in edge computing.

Example 6: The limitations of any of Examples 1-5 and 7, where operations are performed to deploy a rendezvous node selection algorithm that takes into consideration cost and resilience trade-offs, where the rendezvous node selection algorithm minimizes a number of intermediate nodes, and where the rendezvous node selection algorithm is scalable in time and space complexity and number of edge endpoints. As a result, intermediate nodes are reduced for workload management in edge computing.

Example 7: The limitations of any of Examples 1-6, where cost and resilience trade-offs are considered at the edge site. As a result, cost is taken into consideration for workload management in edge computing.

Example 8: A system, comprising a memory, and a processor coupled to the memory, where the processor performs operations, the operations comprising performing a method according to any one of Examples 1-7. As a result, scalable mechanisms are provided for workload management in edge computing and performance improvements are made in the operations of computing systems.

Example 9: A computer program product, the computer program product comprising a computer readable storage medium having computer readable program code embodied therewith, the computer readable program code when executed is configured to perform operations, the operations comprising performing a method according to any of Examples 1-7. As a result, scalable mechanisms are provided for workload management in edge computing and performance improvements are made in the operations of computing systems.

Edge computing brings cloud computing resources to the edge of the network. The number of workloads running at the edge is increasing rapidly at the current time. Additionally, in the future a majority of enterprise-generated data may be created and processed outside the traditional data center or cloud. Deployment of configuration and workloads at the edge at scale raises several challenges: (1) How do systems manage application and Artificial Intelligence model life-cycle at scale? (2) How do systems deploy with limited cloud connectivity? (3) How do systems sustain disconnected operation when connectivity is lost? (4) How do systems gracefully recover from device failures?

Ease of deployment and management of workloads in distributed cloud environments for security reasons and business needs continue to be of increasing importance. Hence, there is a need to ensure that functional and non-functional requirements of resources are met without committing substantial time and capital that companies may not be able to afford. For example, businesses with hundreds of sites cannot afford to spend weeks deploying complex applications at each site and require information technology staff to travel to remote sites to bring the application back online when they fail. Thus, there is a need to deploy workloads and perform management tasks remotely and with ease.

However, with many applications running on the edge becoming as critical as those in the data center, it is of importance for organizations to match the resiliency, scalability, security, high-availability and human information technology resources found in the data center. Organizations may have to address the growing mismatch between the importance of the applications and the infrastructure and information technology that supports them at the edge. Certain embodiments provide frameworks that can provide a mechanism for workload management at the edge across multiple sites.

Managing at scale is the key issue at the edge as the number of edge endpoints located across a multitude of sites can reach several thousand (e.g., a quick service restaurant's drive-through order processing and edge clusters for restaurants) to up to a million (e.g., number of vehicles in a software defined vehicle network and total number of appliances, devices, and sensors in a smart factory across several sites in industry).

It is important to efficiently deploy edge applications and collect status for workloads running in hundreds of thousands to a million or more edge endpoints. To address this issue, certain embodiments provide a framework that provides a peer-to-peer edge abstraction that builds on the idea of rendezvous nodes. It is configurable to accommodate different levels of fault tolerance and costs. Such embodiments avoid a single point of failure through a rendezvous node replication. As a result, fewer physical connections are required, and failure detection and recovery messages can be accommodated in networks of as many as a million or more edge endpoints. As a result, performance improvements are made in the operations of computing systems and mobile networks.

FIG. 1 illustrates a block diagram 100 of an edge computing environment, in accordance with certain embodiments.

Multiple edge sites comprising a first edge site E1 102 and a second edge site E2 104 are shown. Each edge site is comprised of a plurality of servers, where the servers are also referred to as edge servers. For example, the first edge site E1 102 is comprised of three servers S1, S2, S3 (shown via reference numerals 106, 108, 110) and the second edge site E2 104 is comprised of a server S4 and a server S5 (shown via reference numerals 112, 114). In alternative embodiments, certain edge sites may have a single server rather than a plurality of servers.

Services are deployed on the edge servers. Exemplary services such as object recognition service 130, hotel reservation service 132, social network service 134, and media streaming service 136 are shown via the legend 138 at the bottom of FIG. 1. The service deployed on each server is shown. For example, in FIG. 1, server S1 106 has object recognition service 140 shown as running on the server S1. Devices U1, U2, U3, U4, U5 are shown in FIG. 1 (reference numerals 142, 144, 146, 148, 150). The devices U1, U2, U3, U4, U5 (reference numerals 142, 144, 146, 148, 150) may comprise user equipment such as mobile phones that request services deployed on the edge servers S1, S2, S3, S4, S5 (reference numerals 106, 108, 110, 112, 114).

Orchestration platforms are used in certain embodiments. An orchestration platform includes one or more applications that may manage workloads and services in one or more edge sites. In certain embodiments, servers in FIG. 1 may comprise any suitable computational device including those presently known in the art, such as, a personal computer, a workstation, a mainframe, a hand held computer, a palm top computer, a head mounted computer, a telephony device, a network appliance, a blade computer, a processing device, a controller, etc. The elements shown in FIG. 1 may be in any suitable network, such as, a storage area network, a wide area network, the Internet, an intranet, etc., or in a cloud computing environment.

Figure 2:
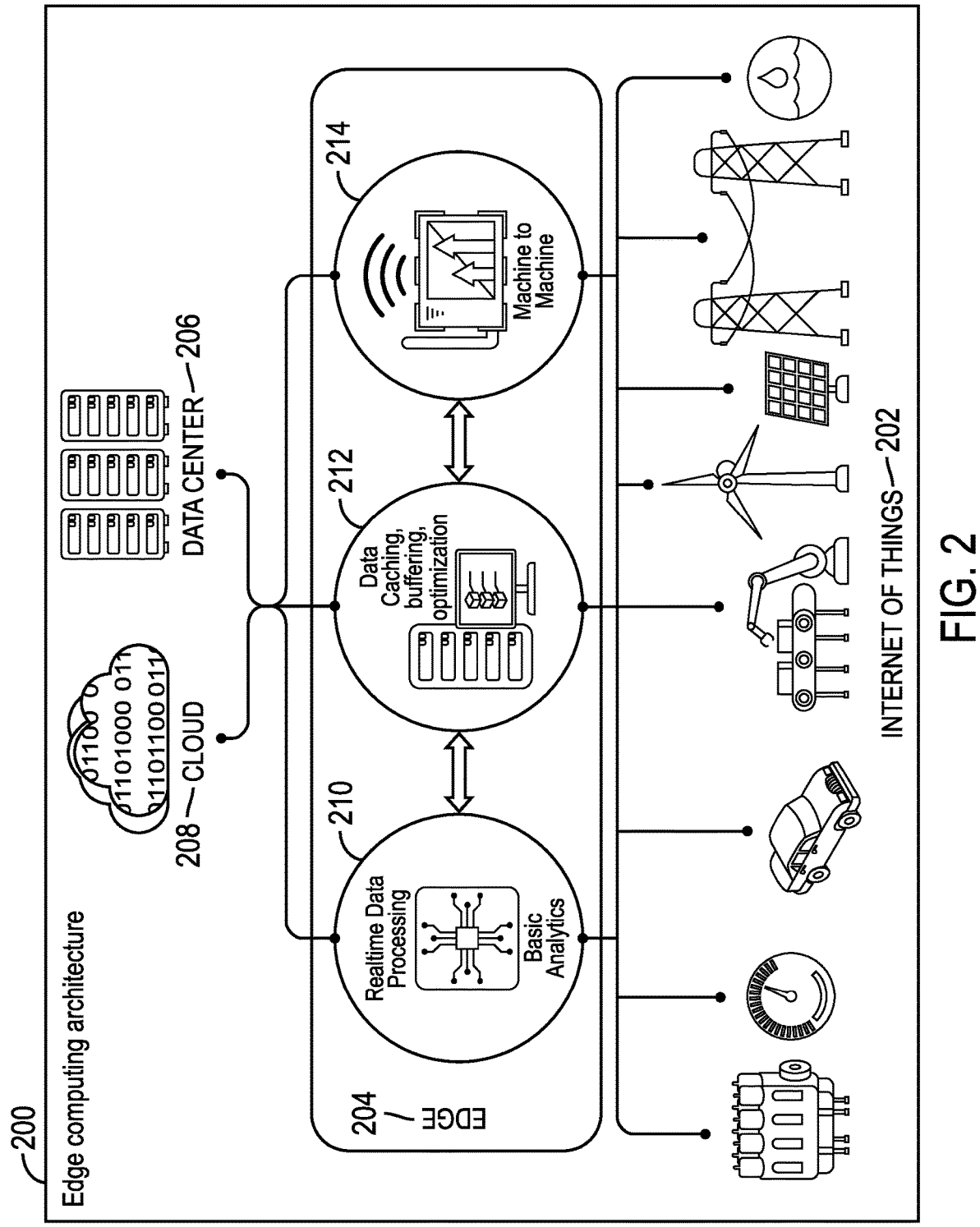
FIG. 2 illustrates a block diagram of an edge computing architecture, in accordance with certain embodiments.

FIG. 2 illustrates a block diagram 200 of an edge computing architecture, in accordance with certain embodiments. A plurality of IoT devices 202 are coupled to one or more edge sites 204. Data centers 206 in a cloud computing framework 208 may be used to manage the one or more edge sites 204 with which the IoT devices 202 interact.

The IoT devices 202 may include various types of devices like automobiles, cell phones, industrial robots, cell towers, and many other types of devices. There may be numerous IoT devices (numbering in thousands or hundreds of thousands or even a million or more). The edge sites may perform real-time data processing and basic analytics, data caching, buffering, and various optimizations, and machine to machine communications (as shown via reference numerals 210, 212, 214).

Figure 3:
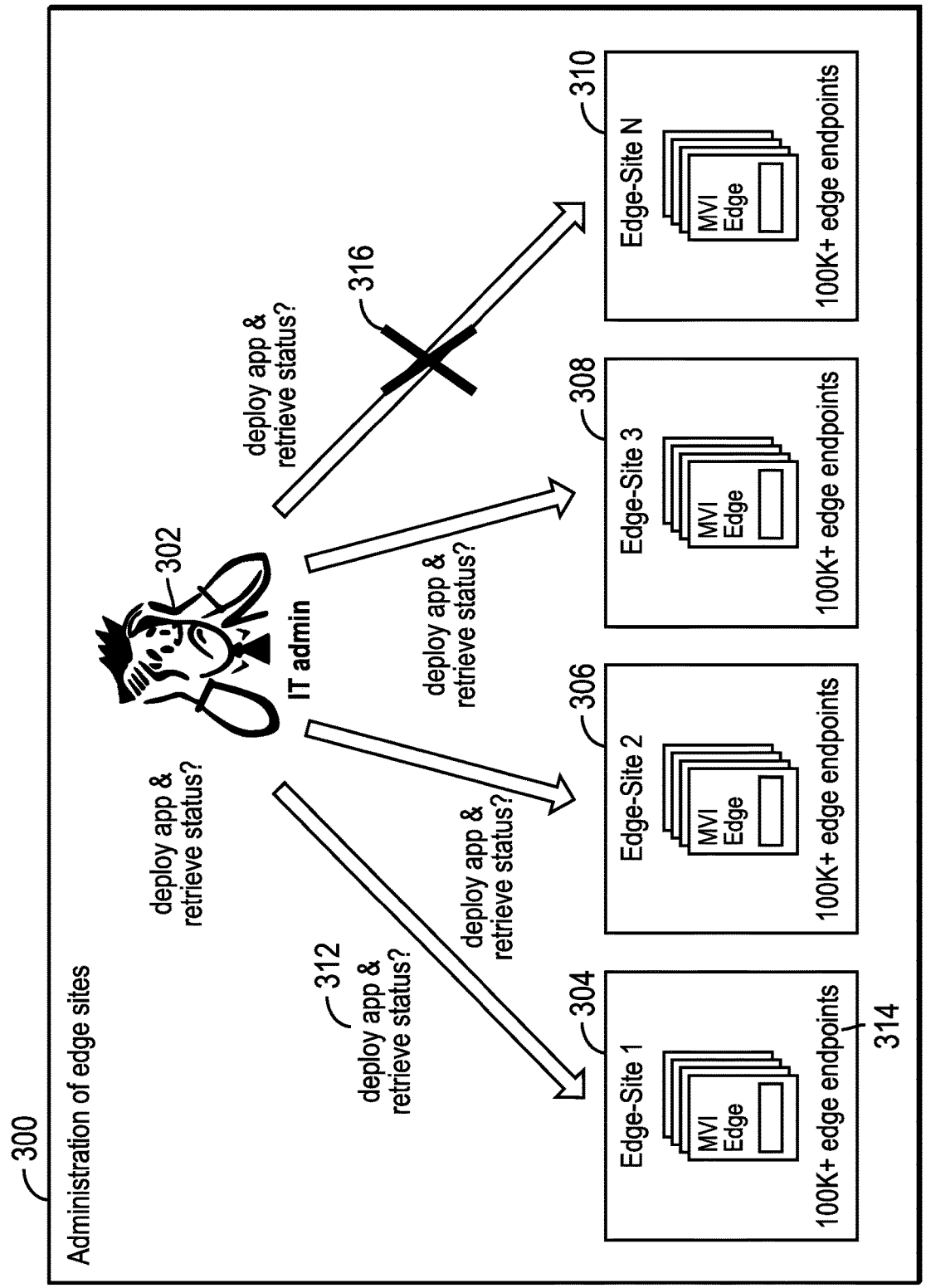
FIG. 3 illustrates a block diagram that shows the administration of edge sites, in accordance with certain embodiments.

FIG. 3 illustrates a block diagram 300 that shows the administration of edge sites, in accordance with certain embodiments.

An information technology administrator 302 is shown to deploy applications and retrieve status for a plurality of edge sites 304, 306, 308, 310. For example, reference numeral 312 indicates the deployment of applications and status retrieval by the information technology administrator 302 with respect to the edge site 304.

Each edge site may have numerous IoT devices interacting with the edge site, where the IoT devices are referred to as edge endpoints. For example, edge site 304 may interact with over 100,000 edge endpoints (shown via reference numeral 314).

It is difficult for the information technology administrator to manage the numerous edge sites that interact with the even more numerous edge points. In certain situations, links from the server of the information technology administrator to certain edge sites may fail (as shown via reference numeral 316) causing problems for edge endpoints that interact with the failed edge site. The hub and spoke model shown in FIG. 3 where a central server via an administrator manages numerous edge sites may become unmanageable as the number of edge sites and edge endpoints become numerous. Single points of failure at the central server are problematical. Additionally, failure of edge sites causes problems.

Certain embodiments are provided to efficiently manage edge application state and workload on a hundred or thousands or million or more devices. To achieve this, certain embodiments use a peer-to-peer edge abstraction that builds on the idea of rendezvous nodes. It is configurable to accommodate different levels of fault tolerance and costs. Such embodiments avoid single points of failures through rendezvous node replication. It may need far fewer physical connections and perform failure detection and recovery in networks of up to a million or more devices. Rendezvous Nodes (or RDV nodes for short), represent a replicated buffer zone between the edge hub and edge endpoint. Rendezvous nodes pull and cache objects from the edge hub. Further, rendezvous nodes aggregate status for all edge endpoints under their management. RDV nodes provide three benefits. First, they reduce the communication overhead at the edge endpoints by limiting edge endpoint-to-edge hub messages. Second, they preserve valuable edge hub bandwidth by avoiding relayed requests for each edge endpoint to the cloud hub and/or object store. Third, rendezvous node redundancy overcomes the single point of failure within an edge site (i.e., the edge hub).

Figure 4:
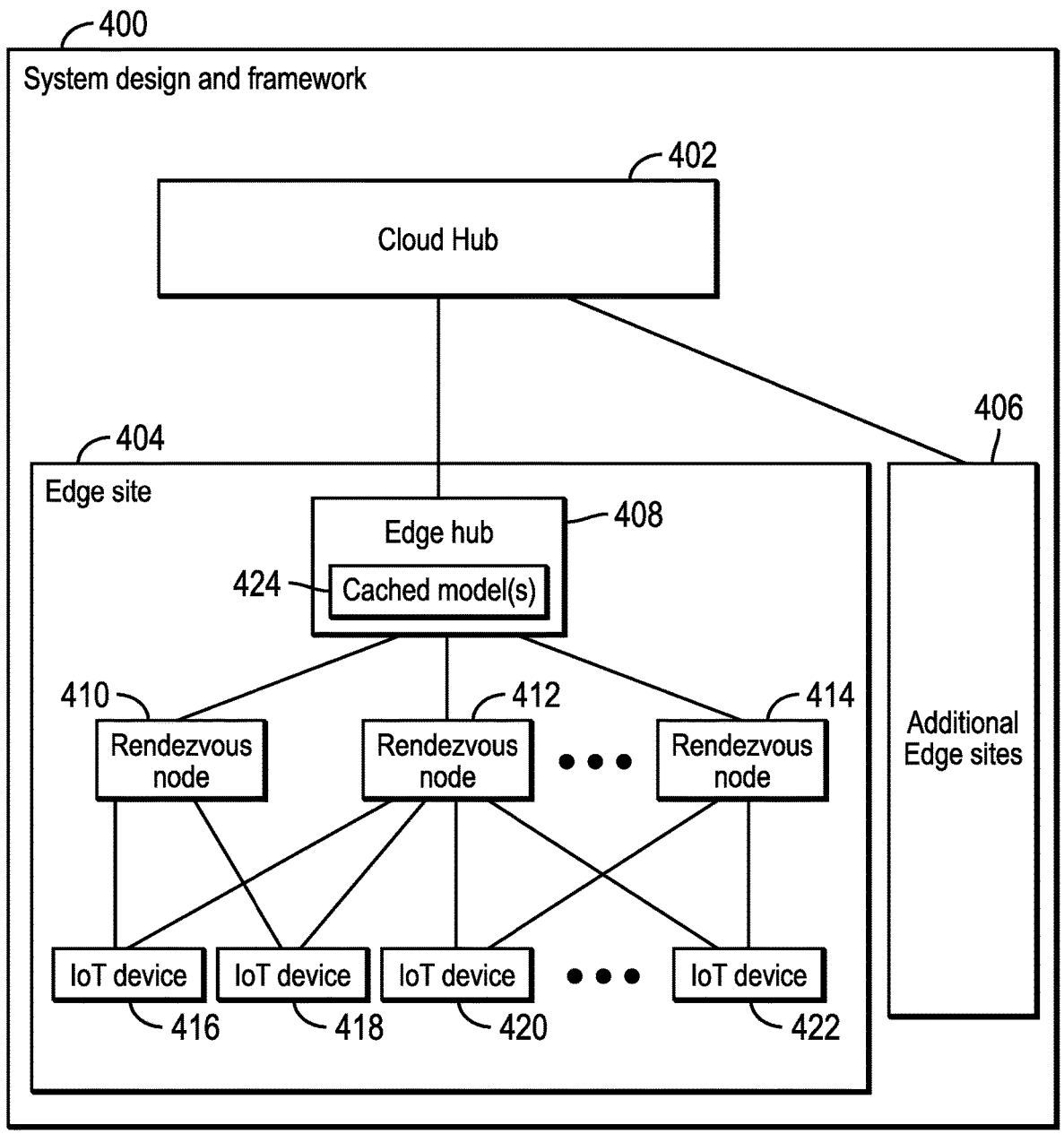
FIG. 4 illustrates a block diagram that shows a system design and framework with scalability, resistance to failure, cost effectiveness, tunability, and caching goals, in accordance with certain embodiments.

FIG. 4 illustrates a block diagram 400 that shows a system design and framework with scalability, resistance to failure, cost effectiveness, configurability, and caching goals, in accordance with certain embodiments.

A cloud hub 402 is coupled to a plurality of edge sites 404, 406, where the number of edge sites may be numerous and may conceivably exceed a hundred or a thousand in number. The cloud hub 402 may be a server computational device that deploys models in edge sites for IoT devices to interact with. The deployed models may include applications but may include other entities besides applications.

FIG. 4 shows an exemplary edge site 404 in detail. The other edge sites 406 may have a similar architecture to edge site 404. Edge site 404 includes an edge hub 408 that is coupled to a plurality of rendezvous nodes 410, 412, 414. The plurality of IoT devices 416, 418, 420, 422 are coupled to the plurality of rendezvous nodes. The edge hub 408 and the rendezvous nodes 410, 412, 412 may comprise any suitable computational device known in the art. It may be noted that an IoT device may communicate with one rendezvous node but may switch over to communication with another rendezvous node in the event of a failure of a rendezvous node.

The edge hub 408 caches the model deployed by the cloud hub 402 in the edge site 404 (as shown via reference numeral 424). By caching the model in the edge hub 408, even if the cloud hub 402 ceases to function the edge site 404 remains operational and the IoT devices can continue to operate with at least the cached model 424, even if the latest model may not be available. As a result, the cloud hub 402 is not a single point of failure for the edge sites 404, 406. It may be noted that caching is being performed at the rendezvous layer.

Figure 5:
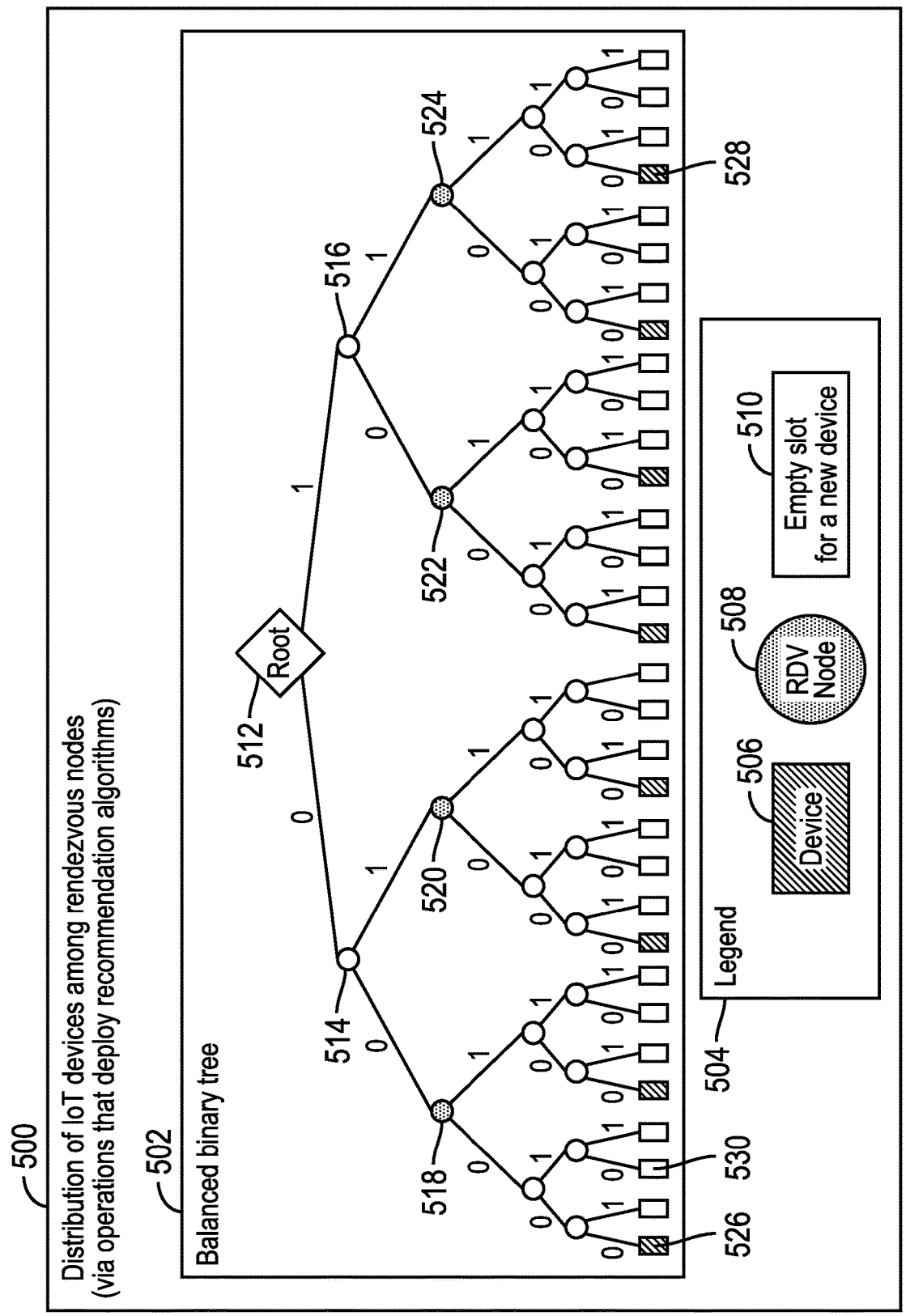
FIG. 5 illustrates a block diagram that shows the distribution of IoT devices among rendezvous nodes, in accordance with certain embodiments.

FIG. 5 illustrates a block diagram 500 that shows the distribution of IoT devices among rendezvous nodes via operations that deploy recommendation algorithms, in accordance with certain embodiments.

A balanced binary tree 502 is constructed via operations that deploy recommendation algorithms to assign the numerous IoT devices to the rendezvous nodes.

The legend 504 shows how the IoT devices 506, the rendezvous nodes 508, and empty slots 510 for IoT devices to be added potentially in the future are indicated in the balanced binary tree 502.

The balanced binary tree 502 has a root node 512 with logical nodes 514, 516 to add the four rendezvous nodes 518, 520, 522, 524 to the binary tree, where the 0 and 1 indications show the two branches from each node. The leaves of the balanced binary tree are the IoT devices.

The numerous IoT devices are distributed in a balanced manner among the rendezvous nodes in the balanced binary tree 502. For example, the IoT device 526 is assigned to rendezvous node 518, and the IoT device 528 is assigned to rendezvous node 524.

Certain leaves of the balanced binary tree 502 are empty slots. In case more IoT devices are added in the future, the added IoT devices may occupy positions in the empty slots to be assigned to a rendezvous node. For example, a new IoT device added in the future may be assigned to empty slot 530 to be assigned to rendezvous node 518.

The balanced binary tree 502 allows the balanced distribution of the numerous IoT devices among the rendezvous nodes such that load is balanced among the rendezvous nodes. Additionally, provision is maintained for added new IoT devices in the balanced binary tree.

FIG. 6 illustrates a block diagram 600 that shows pseudo-code for exemplary recommendation algorithms that generate the balanced binary tree 502, in accordance with certain embodiments. Other algorithms may be used in different embodiments to generate the binary tree 502.

The first algorithm 602 is referred to as a rendezvous (RDV) recommendation algorithm and takes as input the total number of IoT devices 604 ("total_endpts" in FIG. 6) and the percentage coverage of the IoT devices by each rendezvous node 606 ("desired_covg_pct" in FIG. 6). The second algorithm 608 is a depth recommendation algorithm for construction of the balanced binary tree 502. While details of the pseudo-code are provided for the algorithms 602, 608 for generating the balanced binary tree 502, it should be noted that alterative embodiments may generate the balanced binary tree 502 in a different manner.

The algorithms recommend a number of rendezvous nodes per site, defines the coverage of rendezvous nodes, solves the problem of balancing, and scales up and down the number of rendezvous nodes.

Figure 7:
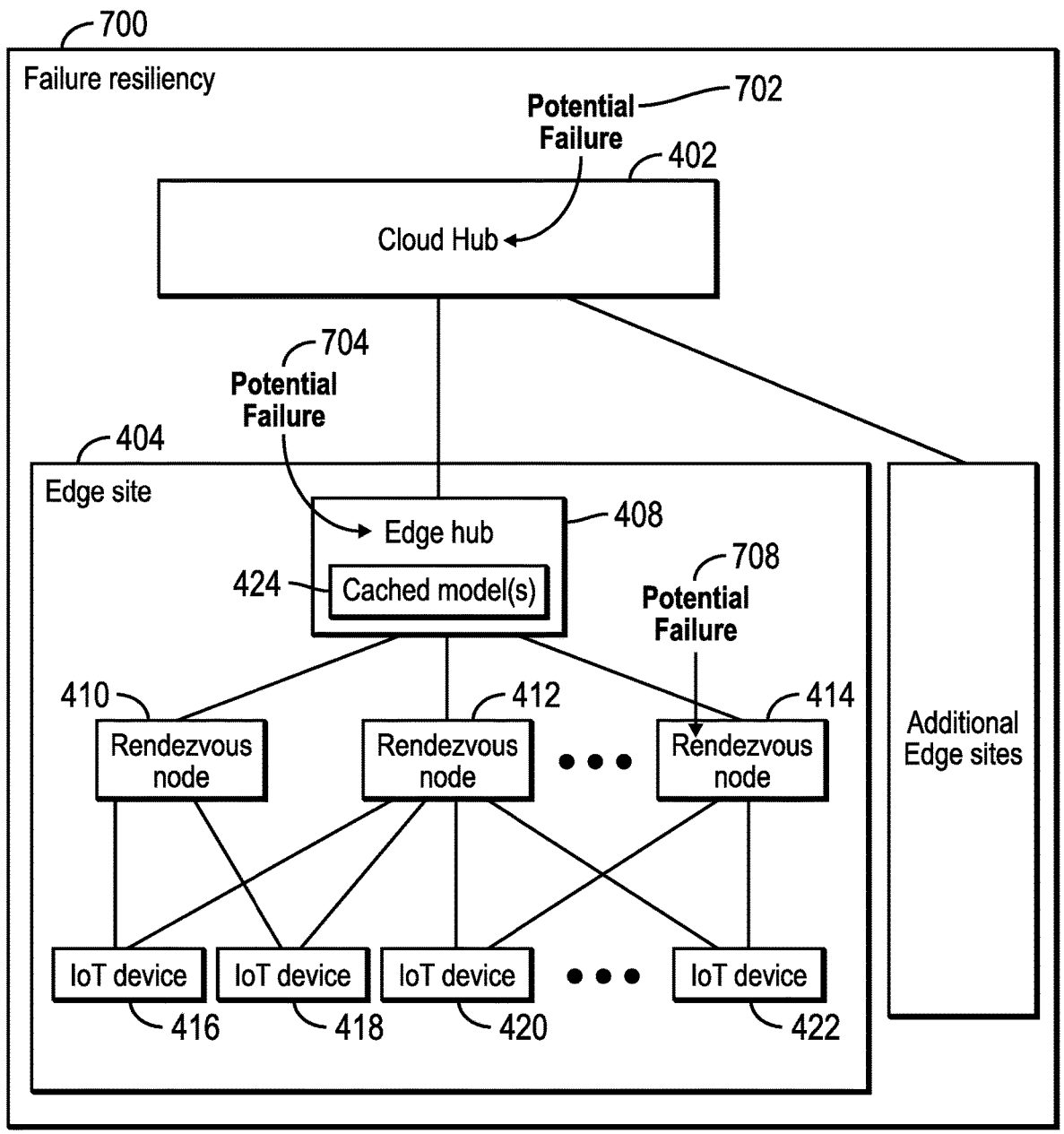
FIG. 7 illustrates a block diagram that shows-failure resilience, in accordance with certain embodiments.

FIG. 7 illustrates a block diagram 700 that shows failure resilience, in accordance with certain embodiments.

Potential failures can occur in the cloud hub 402, edge hub 408, or one or more rendezvous nodes 414 (shown via reference numerals 702, 704, 708) and allow the IoT devices to stay operational.

If the cloud hub 402 fails, then the cached models 424 of the edge hub 408 may be used to allow the rendezvous nodes to stay operational and provide services to the IoT devices. If the edge hub 408 fails, then the IoT devices may continue to use the rendezvous nodes. If one of the rendezvous nodes fails, then the IoT devices that use the failed rendezvous nodes switch over to an operational rendezvous node. Thus, there is failure redundancy in the system.

Figure 8:
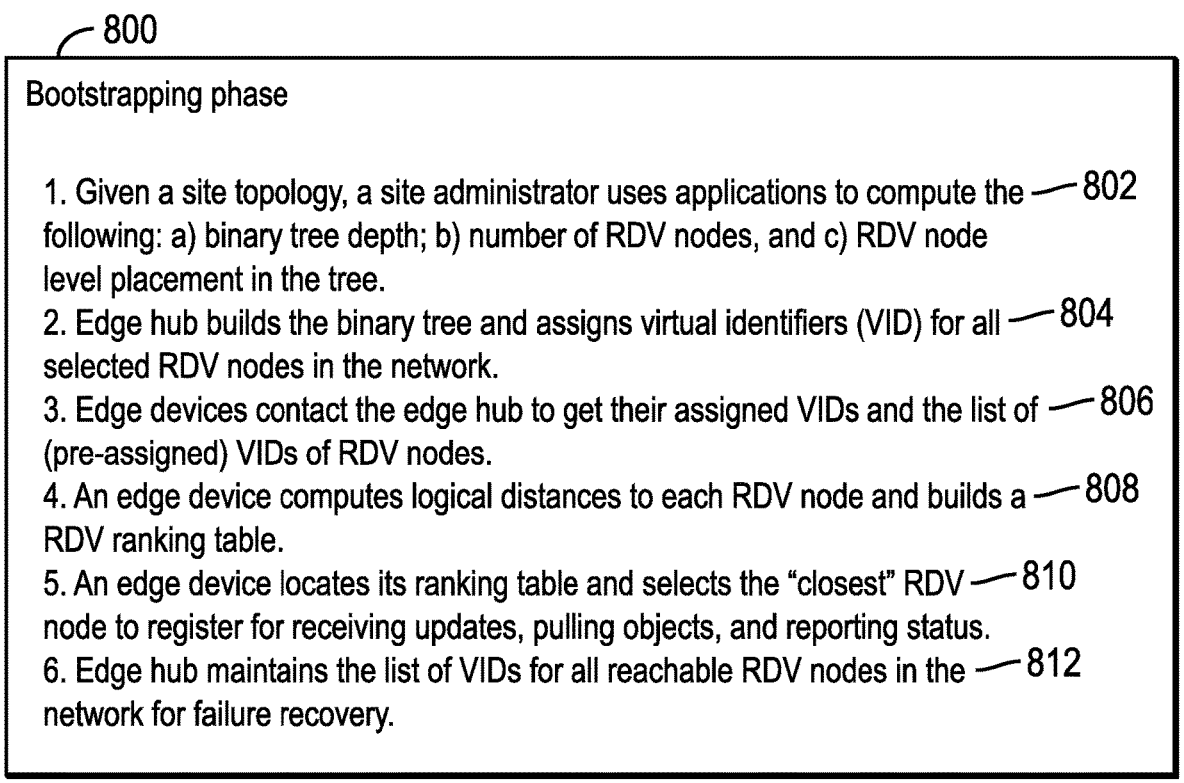
FIG. 8 illustrates a block diagram that shows a bootstrapping phase operations, in accordance with certain embodiments.

FIG. 8 illustrates a block diagram 800 that shows a network bootstrapping phase in accordance with certain embodiments.

During a network bootstrapping phase, the following operations may be performed based on the embodiments:
1. Given a site topology, a site administrator uses applications to compute the following: a) binary tree depth; b) number of RDV nodes, and c) RDV node level placement in the tree (shown via reference numeral 802).
2. Edge hub builds the binary tree and assigns virtual identifiers (VID) for all selected RDV nodes in the network (shown via reference numeral 804).
3. Edge devices contact the edge hub to get their assigned VIDs and the list of (pre-assigned) VIDs of RDV nodes (shown via reference numeral 806).
4. An edge device computes logical distances to each RDV node and builds an RDV ranking table (shown via reference numeral 808).
5. An edge device locates its ranking table and selects the "closest" RDV node to register for receiving updates, pulling objects, and reporting status (shown via reference numeral 810).
6. Edge hub maintains the list of VIDs for all reachable RDV nodes in the network for failure recovery (shown via reference numeral 812).

Figure 9:
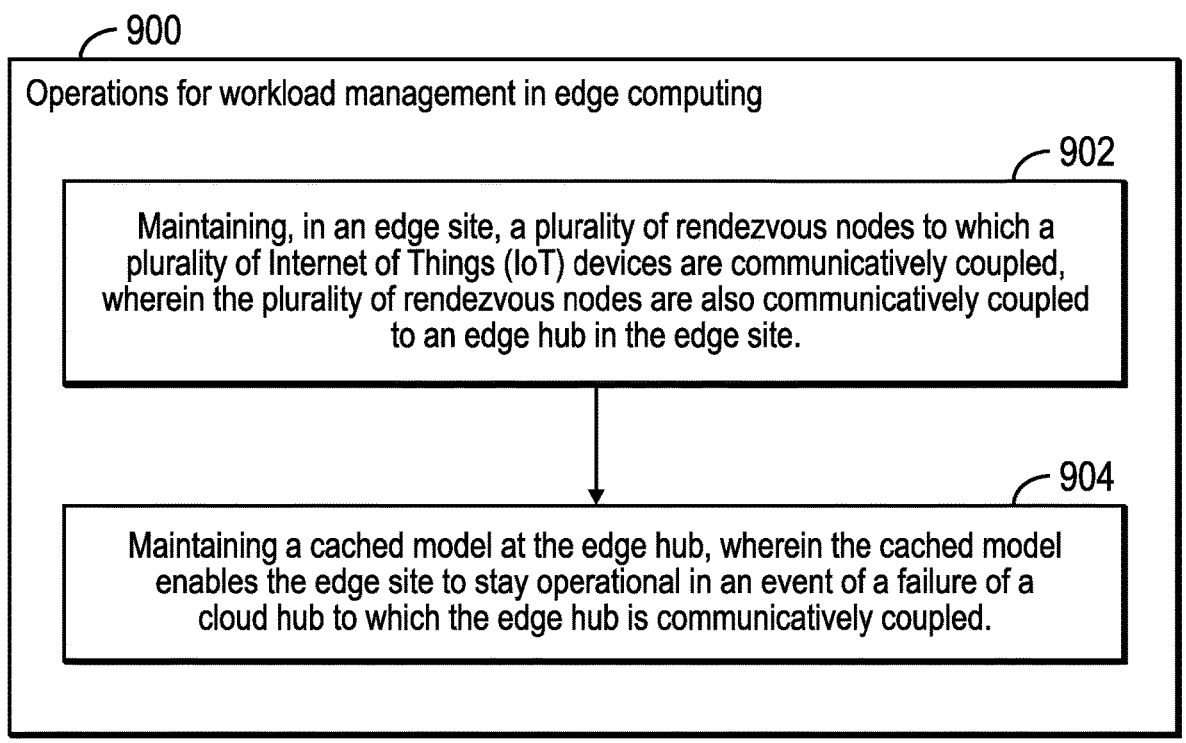
FIG. 9 illustrates a flowchart for workload management in edge computing, in accordance with certain embodiments.

FIG. 9 illustrates a flowchart 900 for workload management in edge computing, in accordance with certain embodiments.

An edge site maintains (at block 902) a plurality of rendezvous nodes to which a plurality of Internet of Things (IoT) devices are communicatively coupled, where the plurality of rendezvous nodes are also communicatively coupled to an edge hub in the edge site.

From block 902 control proceeds to block 904 in which a cached model is maintained at the edge hub, wherein the cached model enables the edge site to stay operational in an event of a failure of a cloud hub to which the edge hub is communicatively coupled.

Therefore, FIGS. 1-9 illustrate embodiments for workload management in edge computing.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 10:
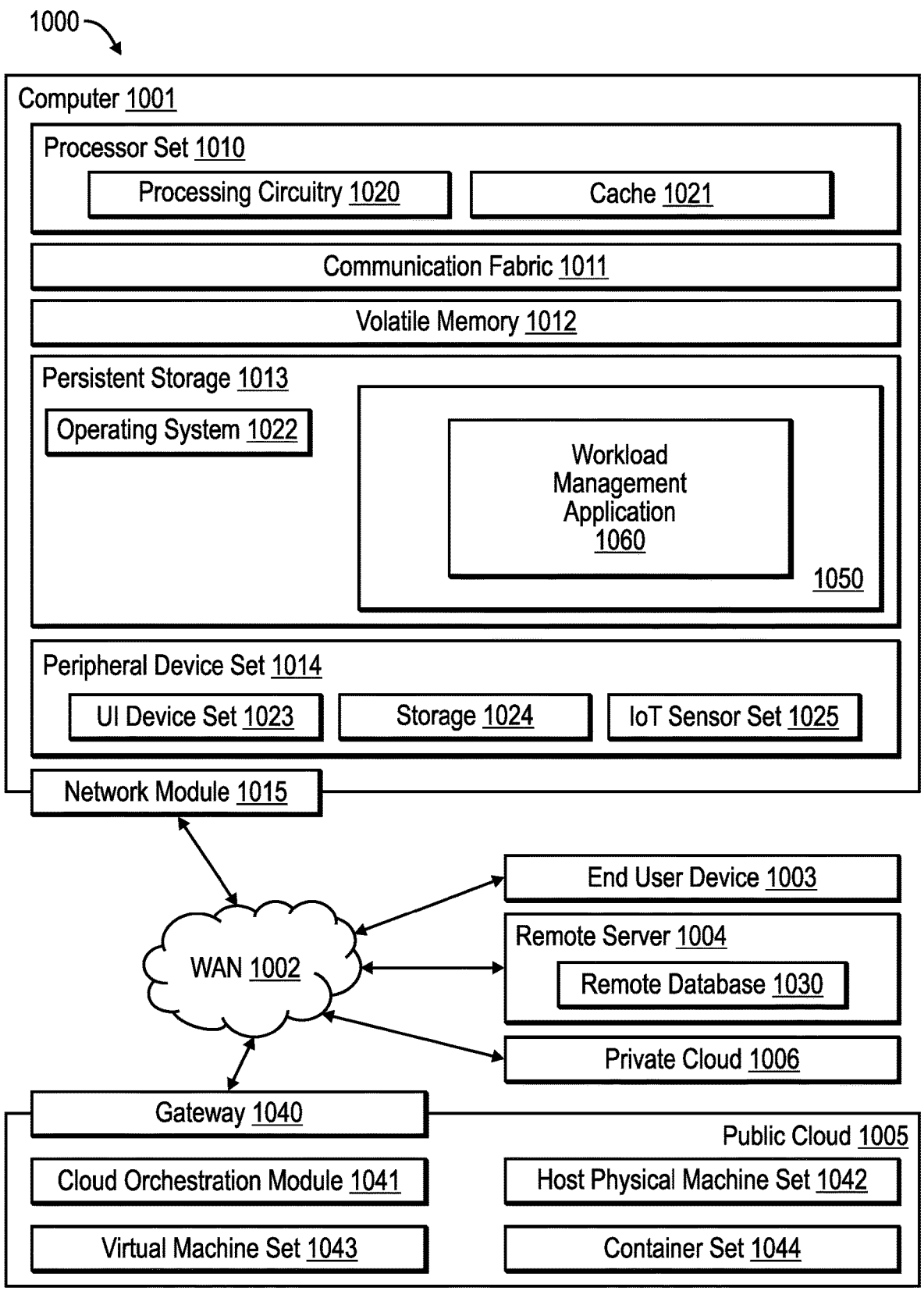
FIG. 10 illustrates a computing environment in which certain components may be implemented, in accordance with certain embodiments.

In FIG. 10, computing environment 1000 contains an example of an environment for the execution of at least some of the computer code (block 1050) involved in performing the operations of a workload management application 1060 that performs operations shown in FIGS. 1-9.

In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface-type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. I/O T sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
maintaining, in an edge site, a plurality of rendezvous nodes to which a plurality of Internet of Things (IoT) devices are communicatively coupled, wherein the plurality of rendezvous nodes are also communicatively coupled to an edge hub in the edge site; and
maintaining a cached model at the edge hub, wherein the cached model enables the edge site to stay operational in an event of a failure of a cloud hub to which the edge hub is communicatively coupled; and
deploying a rendezvous node selection algorithm that takes into consideration cost and resilience trade-offs, wherein the rendezvous node selection algorithm minimizes a number of intermediate nodes, wherein the rendezvous node selection algorithm is scalable in time and space complexity and number of edge endpoints, wherein the plurality of IoT devices are distributed among rendezvous nodes as leaves of a balanced tree, wherein the edge hub maintains a list of virtual identifiers for all reachable rendezvous nodes, wherein one or more of the leaves of the balanced tree are maintained as empty slots for assignment of new IoT devices, and wherein processing load is balanced among the plurality of rendezvous nodes.

2. The method of claim 1, the method further comprising:
generating a balanced binary tree data structure to distribute the plurality of IoT devices among the plurality of rendezvous nodes; and
in response to a failure of a selected rendezvous node, selected IoT devices that were communicatively coupled to the selected rendezvous node are switched to an operational rendezvous node.

3. The method of claim 2, the method further comprising:
in response to a failure of the edge hub, the plurality of rendezvous nodes continue to provide services to the plurality of IoT devices.

4. The method of claim 1, communicatively coupling a plurality of edge hubs of a plurality of edge sites to a cloud hub, the method further comprising:
deploying edge applications and collecting status for workloads at the edge site that provides additional capabilities beyond those provided by a hub and spoke model for edge computing; and
deploying a framework that removes barriers to scale workload lifecycle operations at the edge site and provides multi-layer resilience against failures.

5. The method of claim 1, wherein horizontal scaling is performed across a plurality of edge computing sites, and wherein cached models ensure disconnected operation.

6. The method of claim 1, wherein cost and resilience trade-offs are considered at the edge site.

7. A system, comprising:
a memory; and
a processor coupled to the memory, wherein the processor performs operations, the operations comprising:
maintaining, in an edge site, a plurality of rendezvous nodes to which a plurality of Internet of Things (IoT) devices are communicatively coupled, wherein the plurality of rendezvous nodes are also communicatively coupled to an edge hub in the edge site; and
maintaining a cached model at the edge hub, wherein the cached model enables the edge site to stay operational in an event of a failure of a cloud hub to which the edge hub is communicatively coupled; and
deploying a rendezvous node selection algorithm that takes into consideration cost and resilience trade-offs, wherein the rendezvous node selection algorithm minimizes a number of intermediate nodes, wherein the rendezvous node selection algorithm is scalable in time and space complexity and number of edge endpoints, wherein the plurality of IoT devices are distributed among rendezvous nodes as leaves of a balanced tree, wherein the edge hub maintains a list of virtual identifiers for all reachable rendezvous nodes, wherein one or more of the leaves of the balanced tree are maintained as empty slots for assignment of new IoT devices, and wherein processing load is balanced among the plurality of rendezvous nodes.

8. The system of claim 7, the operations further comprising:
generating a balanced binary tree data structure to distribute the plurality of IoT devices among the plurality of rendezvous nodes; and
in response to a failure of a selected rendezvous node, selected IoT devices that were communicatively coupled to the selected rendezvous node are switched to an operational rendezvous node.

9. The system of claim 8, the operations further comprising:
in response to a failure of the edge hub, the plurality of rendezvous nodes continue to provide services to the plurality of IoT devices.

10. The system of claim 7, communicatively coupling a plurality of edge hubs of a plurality of edge sites to a cloud hub, the operations further comprising:
deploying edge applications and collecting status for workloads at the edge site that provides additional capabilities beyond those provided by a hub and spoke model for edge computing; and
deploying a framework that removes barriers to scale workload lifecycle operations at the edge site and provides multi-layer resilience against failures.

11. The system of claim 7, wherein horizontal scaling is performed across a plurality of edge computing sites, and wherein cached models ensure disconnected operation.

12. The system of claim 7, wherein cost and resilience trade-offs are considered at the edge site.

13. A computer program product, the computer program product comprising a computer readable storage medium having computer readable program code embodied therewith, the computer readable program code when executed is configured to perform operations, the operations comprising:
maintaining, in an edge site, a plurality of rendezvous nodes to which a plurality of Internet of Things (IoT) devices are communicatively coupled, wherein the plurality of rendezvous nodes are also communicatively coupled to an edge hub in the edge site; and
maintaining a cached model at the edge hub, wherein the cached model enables the edge site to stay operational in an event of a failure of a cloud hub to which the edge hub is communicatively coupled; and
deploying a rendezvous node selection algorithm that takes into consideration cost and resilience trade-offs, wherein the rendezvous node selection algorithm minimizes a number of intermediate nodes, wherein the rendezvous node selection algorithm is scalable in time and space complexity and number of edge endpoints, wherein the plurality of IoT devices are distributed among rendezvous nodes as leaves of a balanced tree, wherein the edge hub maintains a list of virtual identifiers for all reachable rendezvous nodes, wherein one or more of the leaves of the balanced tree are maintained as empty slots for assignment of new IoT devices, and wherein processing load is balanced among the plurality of rendezvous nodes.

14. The computer program product of claim 13, the operations further comprising:
generating a balanced binary tree data structure to distribute the plurality of IoT devices among the plurality of rendezvous nodes; and
in response to a failure of a selected rendezvous node, selected IoT devices that were communicatively coupled to the selected rendezvous node are switched to an operational rendezvous node.

15. The computer program product of claim 14, the operations further comprising:
in response to a failure of the edge hub, the plurality of rendezvous nodes continue to provide services to the plurality of IoT devices.

16. The computer program product of claim 13, communicatively coupling a plurality of edge hubs of a plurality of edge sites to a cloud hub, the operations further comprising:
deploying edge applications and collecting status for workloads at the edge site that provides additional capabilities beyond those provided by a hub and spoke model for edge computing; and
deploying a framework that removes barriers to scale workload lifecycle operations at the edge site and provides multi-layer resilience against failures.

17. The computer program product of claim 13, wherein horizontal scaling is performed across a plurality of edge computing sites, and wherein cached models ensure disconnected operation.

18. The computer program product of claim 13, wherein cost and resilience trade-offs are considered at the edge site.

* * * * *